United States Patent  (10) Patent No.: US 10,728,230 B2
Lawson et al.  (45) Date of Patent: Jul. 28, 2020

(54) PROXIMITY-BASED AUTHORIZATION FOR ENCRYPTION AND DECRYPTION SERVICES

(71) Applicant: Dell Products L.P., Round Rock, TX (US)

(72) Inventors: David Craig Lawson, Richardson, TX (US); Garrett Darby Leach, Coppell, TX (US); David A. Consolver, Murphy, TX (US)

(73) Assignee: Dell Products L.P., Round Rock, TX (US)

(*) Notice: Subject to any disclaimer, the term of this patent is extended or adjusted under 35 U.S.C. 154(b) by 210 days.

(21) Appl. No.: 16/027,655

(22) Filed: Jul. 5, 2018

(65) Prior Publication Data
US 2020/0014669 A1 Jan. 9, 2020

(51) Int. Cl.
H04L 29/06 (2006.01)
H04L 9/32 (2006.01)
H04W 12/06 (2009.01)
H04W 12/08 (2009.01)
G06F 21/53 (2013.01)
G06F 12/14 (2006.01)
H04W 4/80 (2018.01)

(52) U.S. Cl.
CPC ...... *H04L 63/0492* (2013.01); *G06F 12/1408* (2013.01); *G06F 21/53* (2013.01); *H04L 9/3263* (2013.01); *H04L 9/3271* (2013.01); *H04L 63/102* (2013.01); *H04L 63/107* (2013.01); *H04L 63/126* (2013.01); *H04W 12/06* (2013.01); *H04W 12/08* (2013.01); *H04W 4/80* (2018.02)

(58) Field of Classification Search
CPC . H04L 63/0492; H04L 9/3271; H04L 9/3263; H04L 63/107; H04L 63/102; H04L 63/126; H04W 4/80; H04W 12/06; H04W 12/08; G06F 21/53; G06F 12/1408
See application file for complete search history.

(56) References Cited

U.S. PATENT DOCUMENTS

| 4,439,670 A * | 3/1984 | Basset | G06Q 20/341 235/380 |
| 2006/0036857 A1* | 2/2006 | Hwang | G06F 21/31 713/168 |

(Continued)

*Primary Examiner* — Don G Zhao
(74) *Attorney, Agent, or Firm* — Baker Botts L.L.P.

(57) ABSTRACT

An information handling system for proximity-based authorization for encryption and decryption services may include a local network, a first memory having a private region, and a secure cryptographic module having a communication module stored within the private region. The secure cryptographic module may, when a first timer tick occurs, transmit a first encrypted challenge to a mobile device over the local network using the communication module. The secure cryptographic module may, when a first encrypted response corresponding to the first encrypted challenge is received from the mobile device via the local network using the communication module, decrypt the first encrypted response to a first response, validate the first response based on the secure cryptographic information, and when the first response is validated, enable access to the security services for the mobile device.

20 Claims, 4 Drawing Sheets

(56) References Cited

U.S. PATENT DOCUMENTS

| | | | |
|---|---|---|---|
| 2006/0133187 A1* | 6/2006 | Fekih-Romdhane | ........................ G11C 29/20 365/230.09 |
| 2008/0263198 A1* | 10/2008 | Heen | ..................... G06F 21/445 709/224 |
| 2008/0301435 A1* | 12/2008 | Simon | ................... H04L 9/3271 713/155 |
| 2010/0031036 A1* | 2/2010 | Chauncey | ........... H04L 63/0428 713/168 |
| 2011/0154043 A1* | 6/2011 | Lim | ........................ G06F 21/73 713/172 |
| 2012/0128157 A1* | 5/2012 | Braun | ................... G06F 21/445 380/270 |
| 2012/0201381 A1* | 8/2012 | Miller | ....................... H04L 9/16 380/255 |
| 2012/0222103 A1* | 8/2012 | Bliding | .................. H04W 4/80 726/7 |
| 2012/0239928 A1* | 9/2012 | Judell | ....................... H04L 9/30 713/168 |
| 2012/0242459 A1* | 9/2012 | Lambert | ........... H04W 12/0605 340/10.3 |
| 2012/0272067 A1* | 10/2012 | Jaquet-Chiffelle | ..... G06F 21/34 713/183 |
| 2013/0046976 A1* | 2/2013 | Rosati | ................ H04W 12/0609 713/168 |
| 2013/0103946 A1* | 4/2013 | Binenstock | ......... H04L 63/0492 713/168 |
| 2013/0160083 A1* | 6/2013 | Schrix | ................ G07C 9/00309 726/3 |
| 2014/0079217 A1* | 3/2014 | Bai | ..................... H04L 63/0869 380/270 |
| 2014/0123223 A1* | 5/2014 | Walsh | ................. H04L 63/0876 726/3 |
| 2014/0139315 A1* | 5/2014 | Keranen | .................... G05B 1/00 340/5.2 |
| 2014/0153714 A1* | 6/2014 | Lambert | ............... H04L 9/3271 380/28 |
| 2014/0156998 A1* | 6/2014 | Lambert | ................. G06F 21/44 713/182 |
| 2014/0201532 A1* | 7/2014 | Toy | ....................... H04W 12/04 713/171 |
| 2014/0282974 A1* | 9/2014 | Maher | ..................... H04L 63/08 726/7 |
| 2014/0295794 A1* | 10/2014 | Doumen | ............... H04B 1/3816 455/411 |
| 2014/0325218 A1* | 10/2014 | Shimizu | ................ H04L 9/3271 713/168 |
| 2014/0344063 A1* | 11/2014 | Vallat | ...................... H04W 4/21 705/14.64 |
| 2015/0143545 A1* | 5/2015 | Falk | ...................... H04L 9/3271 726/30 |
| 2015/0222658 A1* | 8/2015 | Kim | ................... H04L 63/1466 726/22 |
| 2016/0035163 A1* | 2/2016 | Conrad | ................. H04W 12/06 340/5.61 |
| 2016/0036594 A1* | 2/2016 | Conrad | ................. H04L 9/3271 713/185 |
| 2016/0043872 A1* | 2/2016 | Wajs | .................... H04L 9/3271 713/168 |
| 2016/0183090 A1* | 6/2016 | Knaappila | ............. H04W 12/06 726/7 |
| 2016/0261414 A1* | 9/2016 | Lee | ....................... H04L 9/3271 |
| 2016/0323246 A1* | 11/2016 | Zivkovic | ............. H04L 27/2627 |
| 2016/0352605 A1* | 12/2016 | O'Donoghue | ........ H04L 9/3271 |
| 2017/0017957 A1* | 1/2017 | Radu | .................... G06Q 20/3829 |
| 2017/0208463 A1* | 7/2017 | Brand | ................... H04L 63/0876 |
| 2017/0235957 A1* | 8/2017 | Maletsky | ................ G06F 21/44 713/168 |
| 2017/0257364 A1* | 9/2017 | Ligatti | .................... G06F 21/40 |
| 2017/0289120 A1* | 10/2017 | Kohli | ...................... H04L 63/08 |
| 2017/0310488 A1* | 10/2017 | Wajs | .................. H04N 21/4627 |
| 2017/0349143 A1* | 12/2017 | Menard | ............. G07C 9/00309 |
| 2017/0353442 A1* | 12/2017 | Burch | ............... H04W 12/0609 |
| 2018/0004933 A1* | 1/2018 | Nathanson | ............ H04W 12/06 |
| 2018/0013571 A1* | 1/2018 | Aarnio | .................. H04L 9/3234 |
| 2018/0026799 A1* | 1/2018 | Pottier | .................. H04L 9/3265 713/156 |
| 2018/0115859 A1* | 4/2018 | Ghabra | ................... H04W 4/40 |
| 2018/0232971 A1* | 8/2018 | Schieke | ............... H04L 9/3271 |
| 2018/0254889 A1* | 9/2018 | Fiege | ........................ H04L 9/14 |
| 2018/0254910 A1* | 9/2018 | Dutz | ............... H04W 12/04031 |
| 2018/0302226 A1* | 10/2018 | Heimlicher | ........... H04L 9/3271 |
| 2018/0316512 A1* | 11/2018 | Wittenauer | ........... H04L 9/3271 |
| 2018/0351743 A1* | 12/2018 | Michiels | ................ H04L 63/12 |
| 2018/0367994 A1* | 12/2018 | Danev | ................... H04W 12/06 |
| 2019/0020469 A1* | 1/2019 | Dottax | ................ H04L 9/0869 |
| 2019/0058601 A1* | 2/2019 | Papas | ................ G07C 9/00174 |
| 2019/0135229 A1* | 5/2019 | Ledvina | ................ H04W 4/80 |
| 2019/0138707 A1* | 5/2019 | Hiltgen | ................ H04L 9/3247 |

* cited by examiner

PROXIMITY-BASED AUTHORIZATION FOR ENCRYPTION AND DECRYPTION SERVICES

BACKGROUND

Field of the Disclosure

This disclosure relates generally to information handling systems and, more particularly, to proximity-based authorization for encryption and decryption services.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a disclosed information handling system may include a local network, a first memory including a private region, secure cryptographic information stored within the private region, a missed response count of missed responses stored within the private region, and a periodic timer. The private region may be a protected area of execution protected from processes running in the information handling system outside the private region. The information handling system may also include a secure cryptographic module stored within the private region and including a communication module and security services. The secure cryptographic module may set the missed response count to a value of zero. The secure module may also, when a first timer tick of the periodic timer occurs, generate a first challenge based on the secure cryptographic information, encrypt the first challenge to a first encrypted challenge, and transmit the first encrypted challenge to a mobile device over the local network using the communication module. The secure module may further, when a first encrypted response corresponding to the first encrypted challenge is received from the mobile device via the local network using the communication module, decrypt the first encrypted response to a first response, validate the first response based on the secure cryptographic information, and when the first response is validated, reset the missed response count of missed responses to the value of zero and when access to the security services for the mobile device is disabled, enable access to the security services for the mobile device.

In a number of the disclosed embodiments of the information handling system, the secure cryptographic module may also, when a second timer tick of the periodic timer occurs after the first timer tick and no encrypted response has been received from the mobile device, increment the missed response count by a value of one, determine whether the missed response count exceeds a missed response threshold, and when the missed response count exceeds a missed response threshold, disable access to the security services for the mobile device.

In a number of the disclosed embodiments of the information handling system, the mobile device may include a second memory and an authorized response provider. The authorized response provider may, in response to reception of the first encrypted challenge via the local network, decrypt the first encrypted challenge to the first challenge, generate the first response based on the first challenge and authorized response provider information stored at the second memory, encrypt the first response to the first encrypted response, and transmit the first encrypted response to the information handling system over the local network. The authorized response provider information comprises an authorized response provider public certificate associated with the mobile device and a public key.

In a number of the disclosed embodiments of the information handling system, the information handling system may also include a second communication network coupled between the information handling system and the mobile device. The authorized response provider may, when any encrypted challenges are received from the information handling system via the second communication network, discard the encrypted challenges.

In a number of the disclosed embodiments of the information handling system, the information handling system may also include a second communication network coupled between the information handling system and the mobile device. The secure cryptographic module may, when any encrypted responses are received from the mobile device via the second communication network, discard the encrypted responses.

In a number of the disclosed embodiments of the information handling system, the secure cryptographic module may, when no encrypted response has been received from the mobile device, a third timer tick of the periodic timer occurs after the first timer tick, and the missed response count is less than or equal to a missed response threshold, generate a second challenge based on the secure cryptographic information, encrypt the second challenge to a second encrypted challenge, and transmit the second encrypted challenge to the mobile device over the local network using the communication module. The secure cryptographic module may also, when a second encrypted response is received from the mobile device via the local network using the communication module decrypt the second encrypted response to a second response, validate the second response based on the secure cryptographic information. The secure cryptographic module may, when the second response is validated, reset the missed response count to the value of zero and enable access to the security services for the mobile device.

In a number of the disclosed embodiments of the information handling system, the secure cryptographic module may, when access to the security services for the mobile device is enabled and a third timer tick of the periodic timer occurs after the first timer tick, generate a second challenge based on the secure cryptographic information, encrypt the second challenge to a second encrypted challenge, and transmit the second encrypted challenge to the mobile device over the local network using the communication module. The secure cryptographic module may, when a second encrypted response is received from the mobile device via the local network using the communication module, decrypt the second encrypted response to a second response and validate the second response based on the secure cryptographic information. The secure cryptographic module may, when the second response is validated, reset the missed response count to the value of zero.

In a number of the disclosed embodiments of the information handling system, the secure cryptographic information may comprise an authorized response provider public certification provided to the secure cryptographic module by the mobile device and a last challenge transmitted to the mobile device.

In a number of the disclosed embodiments of the information handling system, the local network may comprise one of a Bluetooth Low Energy (LE) wireless network, a Bluetooth wireless network, or a near-field communication (NFC) network. Communication via the local network may be limited to one of a communication range of the Bluetooth LE wireless network, a communication range of the Bluetooth wireless network, or a communication range of the near-field communication (NFC) network.

In a number of the disclosed embodiments of the information handling system, the protected area of execution of the private region of the first memory may comprise an Intel® software guard extensions enclave. The secure cryptographic module may further comprise Intel® software guard extensions instructions.

In a second embodiment, a disclosed method may include, setting, by a secure cryptographic module of an information handling system stored within a private region of a first memory, a missed response count of missed responses stored within the private region to a value of zero. The private region may be a protected area of execution protected from processes running in the information handling system outside the private region. The method may also include, when a first timer tick of a periodic timer of the information handling system occurs, generating a first challenge based on secure cryptographic information stored within the private region, encrypting the first challenge to a first encrypted challenge, and transmitting the first encrypted challenge to a mobile device over a local network using a communication module of the secure cryptographic module. The method may further include, when a first encrypted response corresponding to the first encrypted challenge is received from the mobile device via the local network using the communication module, decrypting the first encrypted response to a first response and validating the first response based on the secure cryptographic information. The method may also include, when the first response is validated, resetting the missed response count of missed responses to the value of zero and when access to security services of the secure cryptographic module for the mobile device is disabled, enabling access to the security services for the mobile device.

In a number of the disclosed embodiments of the method, the method may also include, when a second timer tick of the periodic timer occurs after the first timer tick and no encrypted response has been received from the mobile device, incrementing the missed response count by a value of one and determining whether the missed response count exceeds a missed response threshold. The method may further include, when the missed response count may exceed a missed response threshold, disabling access to the security services for the mobile device.

In a number of the disclosed embodiments of the method, the method may also include, in response to reception of the first encrypted challenge via the local network by an authorized response provider stored at the second memory of the mobile device, decrypting, by the authorized response provider, the first encrypted challenge to the first challenge and generating, by the authorized response provider, the first response based on the first challenge and authorized response provider information stored at the second memory. The authorized response provider information may comprise an authorized response provider public certificate associated with the mobile device and a public key. The method may further include, encrypting, by the authorized response provider, the first response to the first encrypted response and transmitting, by the authorized response provider, the first encrypted response to the information handling system over the local network.

In a number of the disclosed embodiments of the method, the method may also include, when any encrypted challenges are received from the information handling system via a second communication network coupled between the information handling system and the mobile device, discarding, by the authorized response provider, the encrypted challenges.

In a number of the disclosed embodiments of the method, the method may also include, when any encrypted responses are received from the mobile device via a second communication network coupled between the information handling system and the mobile device, discarding, by the secure cryptographic module, the encrypted responses.

In a number of the disclosed embodiments of the method, the method may also include, when no encrypted response has been received from the mobile device, a third timer tick of the periodic timer occurs after the first timer tick, and the missed response count is less than or equal to a missed response threshold, generating a second challenge based on the secure cryptographic information, encrypting the second challenge to a second encrypted challenge, and transmitting the second encrypted challenge to the mobile device over the local network using the communication module. The method may further include, when a second encrypted response is received from the mobile device via the local network using the communication module, decrypting the second encrypted response to a second response and validating the second response based on the secure cryptographic information. The method may also include, when the second response is validated, resetting the missed response count to the value of zero and enabling access to the security services for the mobile device.

In a number of the disclosed embodiments of the method, the method may also include, when access to the security services for the mobile device is enabled and a third timer tick of the periodic timer occurs after the first timer tick, generating a second challenge based on the secure cryptographic information, encrypting the second challenge to a second encrypted challenge, and transmitting the second encrypted challenge to the mobile device over the local network using the communication module. The method may further include, when a second encrypted response is received from the mobile device via the local network using the communication module, decrypting the second encrypted response to a second response, validating the second response based on the secure cryptographic information, and when the second response is validated, resetting the missed response count to the value of zero.

In a number of the disclosed embodiments of the method, the secure cryptographic information may include an authorized response provider public certification provided to the secure cryptographic module by the mobile device and a last challenge transmitted to the mobile device.

In a number of the disclosed embodiments of the method, the local network comprises one of a Bluetooth Low Energy (LE) wireless network, a Bluetooth wireless network, or a near-field communication (NFC) network, and wherein communication via the local network is limited to one of a communication range of the Bluetooth LE wireless network, a communication range of the Bluetooth wireless network, or a communication range of the near-field communication (NFC) network.

In a number of the disclosed embodiments of the method, the protected area of execution of the private region of the first memory may comprise an Intel® software guard extensions enclave. The secure cryptographic module may further comprise Intel® software guard extensions instructions.

BRIEF DESCRIPTION OF THE DRAWINGS

For a more complete understanding of the present invention and its features and advantages, reference is now made to the following description, taken in conjunction with the accompanying drawings, in which.

Figure 1:
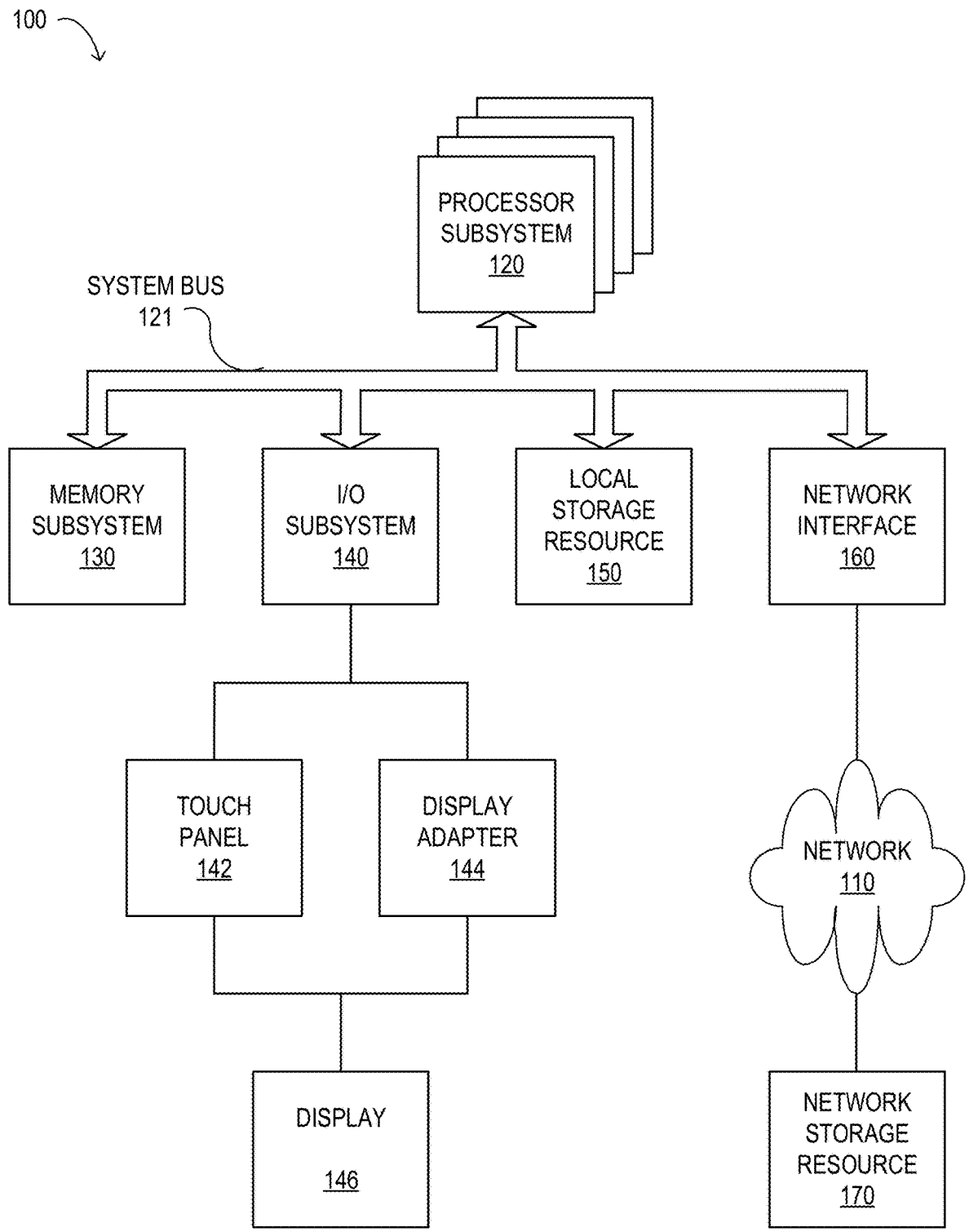
FIG. 1 is a block diagram of selected elements of an embodiment of an information handling system.

DESCRIPTION OF PARTICULAR
EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72."

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1, 2, 3, and 4 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device. As shown, I/O subsystem 140 may comprise touch panel 142 and display adapter 144. Touch panel 142 may include circuitry for enabling touch functionality in conjunction with display 146 that is driven by display adapter 144.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

A cryptographic services system may provide a cryptographic services environment including encryption and decryption services from a first information handling system such as a laptop computer to a second information handling system such as a mobile device. Typical cryptographic services systems provide the secure cryptographic services environment using a hardware cryptographic device that completely contains the cryptographic services. These cryptographic services are typically unlocked using normal user authentication. However, if user credentials for the user authentication process are obtained illegitimately, they may be utilized to access sensitive information at the first information handling system. The traditional authentication methods used for authentication are easy to overcome. Hard-coded keys can be lifted from the binary, key generation algorithms can be reversed engineered, and Obfuscation can be reversed. As such these cryptographic services systems may be compromised using malicious and untrusted applications to connect and consume the cryptographic services.

As will be described in further detail herein, the inventors of the present disclosure have discovered systems and methods for proximity-based authorization for encryption and decryption services. A secure cryptographic module may be implemented with Intel® software guard extensions (SGX). The secure cryptographic module in a computer system may utilize a secure challenge and response mechanism to unlock the cryptographic services provided by the secure cryptographic module. The secure cryptographic module may generate a challenge message which is transmitted to a remote system, such as a mobile device, via a local communications medium, such as Bluetooth Low Energy (BLE). The mobile device may provide a response message corresponding to the challenge message which is transmitted to the secure module via the local communications medium. The secure cryptographic module may validate the response message. When the response message is successfully validated, the secure cryptographic module may unlock the cryptographic service functions for the mobile device. By providing the proximity authorization, both user authentication and the mobile device are required to gain access to sensitive information which provides an additional factor of authorization to the secure cryptographic services provided by the secure cryptographic module.

Figure 2:
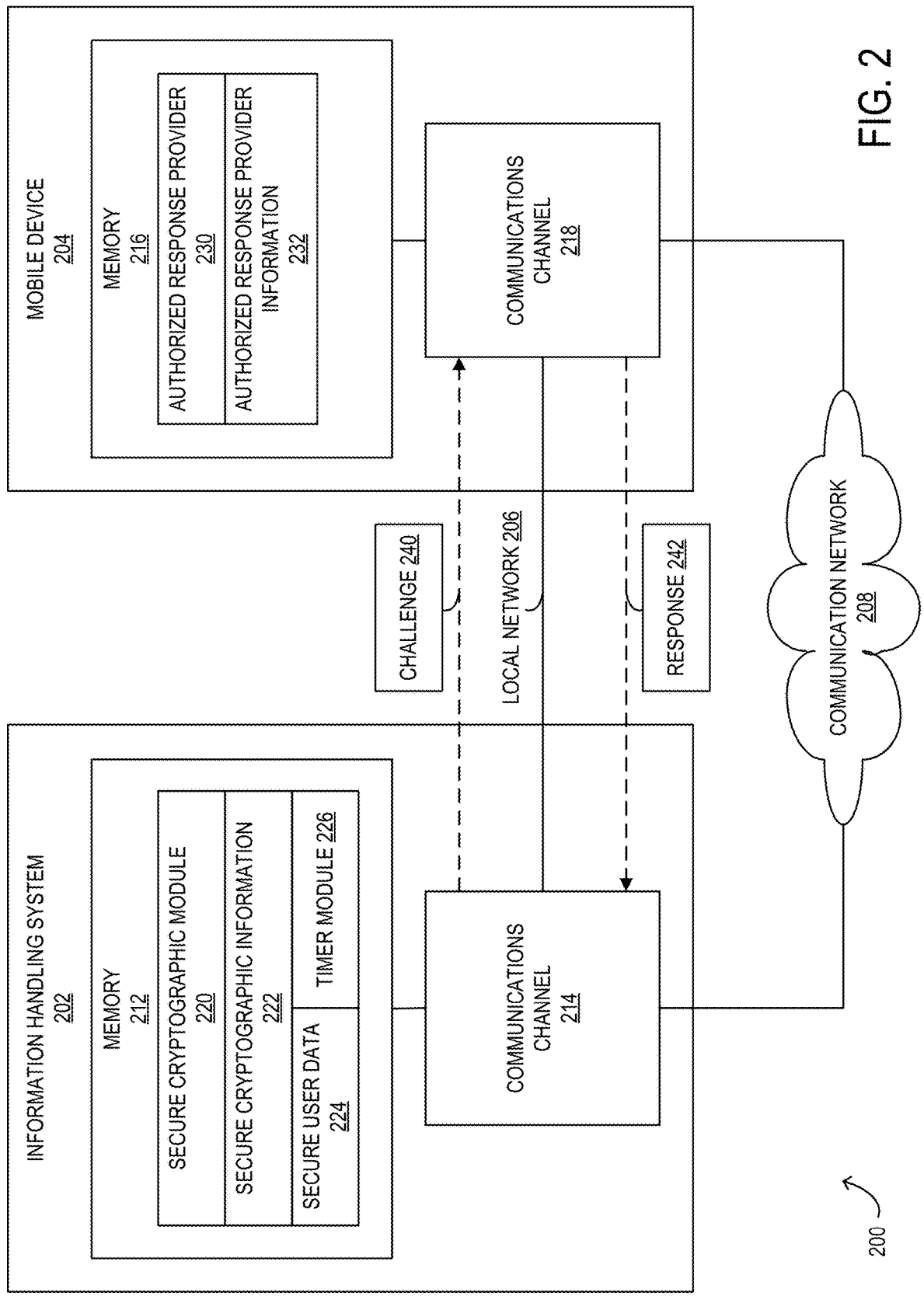
FIG. 2 is a block diagram of selected elements of an embodiment of a secure cryptographic services system for proximity-based authorization for encryption and decryption services.

Turning now to FIG. 2, a block diagram depicting selected elements of an embodiment of a secure cryptographic services system 200 for proximity-based authorization for encryption and decryption services. As shown in FIG. 2, components of secure cryptographic services system 200 may include, but are not limited to, an information handling system 202, a mobile device 204, a local network 206, and a communication network 208. Information handling system 202 may be structurally and functionally similar to information handling system 100 previously described with reference to FIG. 1. Mobile device 204 may be a portable information handling system structurally and functionally similar to information handling system 100. Local network 206 may comprise one of a Bluetooth Low Energy (LE) wireless network, a Bluetooth wireless network, or a near-field communication (NFC) network. Local network 206 may have a short range of communication, which may correspond to one of the communication range of the Bluetooth LE wireless network, the communication range of the Bluetooth wireless network, or the communication range of the near-field communication (NFC) network. Communication network 208 may be network 110 which may also be an Ethernet network, a Wi-Fi network, or another type of broadband technology network.

Information handling system 202 may include a memory 212 of memory subsystem 130 of information handling system 202 and a communications channel 214. Memory 212 may store a set of code instructions that can be executed by a processor of processor subsystem 120 of information handling system 202 to perform one or more of the methods or computer based functions disclosed herein. A secure cryptographic module 220 may comprise a first set of code instructions that can be executed by the processor of information handling system 202. Secure cryptographic module 220 may comprise Intel® software guard extensions. The Intel® software guard extensions may be used to allocate a private region of memory 212. Secure cryptographic module 220 and data may be stored within the private region of memory 212, which may protect secure cryptographic module 220 and data from unauthorized viewing and modification by Intel® software guard extensions. The private region of memory 212 may be a protected area of execution protected from processes running in the information handling system outside the private region. As such, secure cryptographic module 220 may also be protected from processes running at higher level privileges in information handling system 202 outside the private region.

A timer module 226 may comprise a second set of code instructions that can be executed by the processor of information handling system 202. Timer module 226 may also be securely stored within the private region of memory 212. Timer module 226 may implement a periodic timer that generates a timer tick every period of time. The period of time of timer module 226 may be programmable. For example, the period of time may be 5 seconds and timer module 226 may generate a timer tick every 5 seconds. The period of time may be programmed to be set to 1 second, 5 seconds, or another appropriate period of time.

Information handling system 202 may maintain secure cryptographic information 222 and secure user data 224 which may be stored at memory 212 and protected using security services including encryption and decryption services provided by secure cryptographic module 220. Secure cryptographic information 222 may include a copy of an authorized response provider public certification provided to secure cryptographic module 220 by mobile device 204, a missed response count of missed responses, and a timer tick count of timer ticks that have occurred. Secure user data 224 may include user data files, user account information, or other types of user data.

Communications channel 214 may be coupled to local network 206 and communication network 208 and may be utilized by secure cryptographic module 220 to communicate with mobile device 204 via local network 206 and/or communication network 208 using communication protocols appropriate for each network.

Mobile device 204 may include a memory 216 of memory subsystem 130 of mobile device 204 and a communications channel 218. Memory 216 may store a set of code instructions that can be executed by a processor of processor subsystem 120 of mobile device 204 to perform one or more of the methods or computer based functions disclosed herein. An authorized response provider 230 may comprise a third set of code instructions that can be executed by the processor of mobile device 204. In some embodiments, authorized response provider 230 may comprise Intel® software guard extensions. The Intel® software guard extensions may be used to allocate a private region of memory 216. Authorized response provider 230 and data may be stored within the private region of memory 216, which may protect authorized response provider 230 and data from unauthorized viewing and modification by Intel® software guard extensions.

Mobile device 204 may maintain authorized response provider information 232 which may be stored at memory 216 and protected using encryption and decryption. Authorized response provider information 232 may include a copy of an authorized response provider public certificate associated with mobile device 204 and a public key corresponding to the authorized response provider public certificate provided to secure cryptographic module 220.

Communications channel 218 may be coupled to local network 206 and communication network 208 and may be utilized by authorized response provider 230 to communicate with information handling system 202 via local network 206 and/or communication network 208 using communication protocols appropriate for each network.

Installation of authorized response provider public and private certificates and public and private keys corresponding to the authorized response provider public and private certificates in memory 212 of information handling system 202 and memory 216 of mobile device 204 may be accomplished by an authorization process, an initialization process, a registration process, or another type of process by an authorized user of information handling system 202 and mobile device 204.

During operation, information handling system 202 may be used by an authorized user. The authorized user may also be an authorized user of mobile device 204 and may be in possession of mobile device 204. Information handling system 202 and mobile device 204 may be connected to each other via local network 206. Information handling system 202 and mobile device 204 may also be connected to each other via communication network 208.

Secure cryptographic module 220 may set a missed response count of missed responses of secure cryptographic information 222 to a value of zero and set a timer tick count of timer ticks of secure cryptographic information 222 to a value of zero. Secure cryptographic module 220 may, when a first timer tick of timer module 226 occurs, generate a first challenge based on secure cryptographic information 222. The first challenge may include a thumbprint of the authorized response provider public certification of secure cryptographic information 222 provided to secure cryptographic module 220 by mobile device 204 and a randomly generated nonce. Secure cryptographic module 220 may increment the timer tick count. Secure cryptographic module 220 may encrypt the first challenge to a first encrypted challenge 240. Secure cryptographic module 220 may transmit the first encrypted challenge 240 to mobile device 204 over local network 206 using communications channel 218.

Authorized response provider 230 may receive the first encrypted challenge 240 via local network 206 provided by communications channel 214. Authorized response provider 230 may decrypt the first encrypted challenge 240 to the first challenge using authorized response provider information 232 including the public and private keys of authorized response provider information 232. Authorized response provider 230 may generate a first response based on the first challenge. Authorized response provider 230 may randomly generate a nonce. The first response may include the first challenge and the randomly generated nonce. Authorized response provider 230 may encrypt the first response to the first encrypted response 242 using the private key associated with the authorized response provider public certification of authorized response provider information 232 identified by the thumbprint in the first challenge. Authorized response provider 230 may transmit first encrypted response 242 to information handling system 202 over local network 206 using communications channel 218.

When first encrypted response 242 corresponding to the first encrypted challenge 240 is received from mobile device 204 via the local network and provided to secure cryptographic module 220 by communications channel 214, secure cryptographic module 220 may decrypt first encrypted response 242 to a first response using the public key of secure cryptographic information 222 associated with associated with the authorized response provider public certification of secure cryptographic information 222. Secure cryptographic module 220 may validate the first response based on secure cryptographic information 222. Secure cryptographic module 220 may compare the last challenge transmitted to mobile device 204 of secure cryptographic information 222 to the first challenge in the first response. When the last challenge matches the first challenge in the first response, the first response is validated. When the first response is validated, secure cryptographic module 220 may enable access to the security services of secure cryptographic module 220 for mobile device 204 for the next timer periods, which may be up to the access timer tick threshold. When secure cryptographic module 220 is unable to validate the first response such as when the last challenge does not match the first challenge in the first response, secure cryptographic module 220 may disable access to the security service for mobile device 204.

When a second timer tick of timer module 226 occurs after the first timer tick and no encrypted response has been received from the mobile device during the intervening time, secure cryptographic module 220 may increment the timer tick count to indicate another timer tick has occurred and increment the missed response count to indicate that another encrypted response has not been received from mobile device 204 based on the last challenge sent. Secure cryptographic module 220 may determine whether access to the security services for mobile device 204 may be disabled based on the missed response count of missed responses. When secure cryptographic module 220 determines that access to the security services for mobile device 204 may be disabled, secure cryptographic module 220 may disable access to the security services for mobile device 204. Secure cryptographic module 220 may determine that access to the security services for mobile device 204 may be disabled when the missed response count exceeds a missed response threshold. For example, the missed response threshold may be set to a value of two. When two periodic timer ticks occur without an encrypted response being received, secure cryptographic module 220 may disable access to the security services for mobile device 204. The missed response threshold may be set to a value of 1, a value of 3, or another appropriate value.

When no encrypted response has been received from mobile device 204, a third timer tick of timer module 226 occurs after the first timer tick, and the missed response count is less than or equal to the missed response threshold, secure cryptographic module 220 may generate a second encrypted challenge 240 based on the secure cryptographic information and transmit the second encrypted challenge 240 to mobile device 204 over local network 206. When a second encrypted response 242 may be received from mobile device 204 via local network 206, secure cryptographic module 220 may decrypt the second encrypted response 242 to a second response and validate the second response based on secure cryptographic information 222. When the second response is validated, secure cryptographic module 220 may enable access to the security services for mobile device 204 for the next timer periods, which may be up to the access timer tick threshold.

When access to the security services for the mobile device is enabled, a third timer tick of the periodic timer occurs after the first timer tick, and a timer tick count of timer ticks exceeds the access timer tick threshold, secure cryptographic module 220 may generate a second encrypted challenge 240 based on secure cryptographic information 222 and transmit the second encrypted challenge 240 to the mobile device over the local network. When a second encrypted response 242 may be received from mobile device 204 via local network 206, secure cryptographic module 220 may decrypt the second encrypted response 242 to a second response and validate the second response based on secure cryptographic information 222. When the second response is validated, secure cryptographic module 220 may reset the timer tick count back to the value of zero.

When any encrypted responses 242 may be received from mobile device 204 via communication network 208, secure cryptographic module 220 discard the encrypted responses. When any encrypted challenges are received from information handling system 102 via communication network 208, authorized response provider 230 may discard the encrypted challenges 240.

Figure 3:
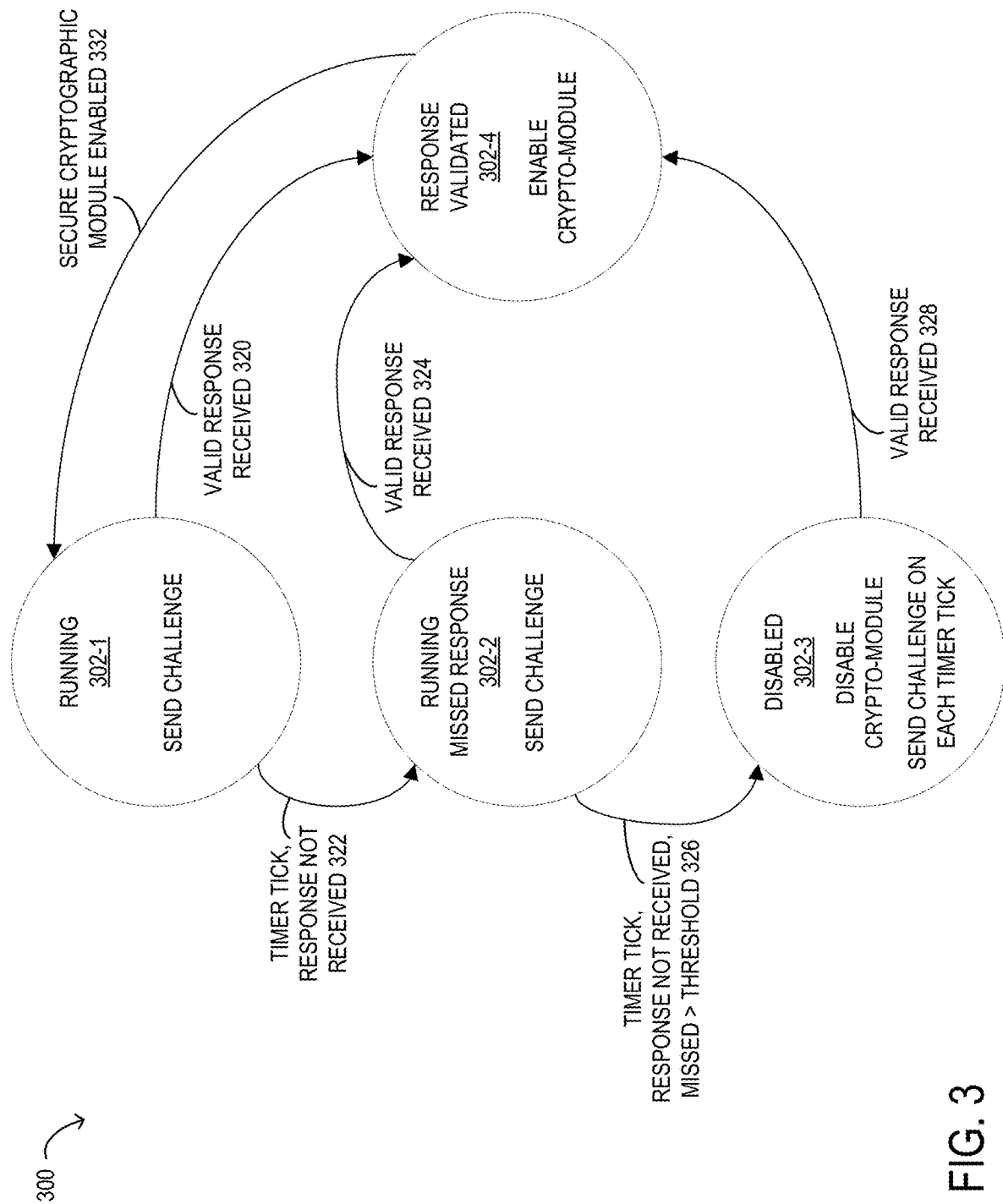
FIG. 3 is a state diagram for an embodiment of a secure cryptographic module for proximity-based authorization for encryption and decryption services.

Referring now to FIG. 3, a secure cryptographic module state machine 300 is illustrated. Secure cryptographic module state machine 300 describes states of secure cryptographic module 220 for performing proximity-based authorization for encryption and decryption services method, as described herein. In various embodiments, the proximity-based authorization for encryption and decryption services method described herein may be implemented with fewer or more elements than depicted in secure cryptographic module state machine 300.

In secure cryptographic module state machine 300, states 302 represent certain security services access states of secure cryptographic module 220 when connected to mobile device 204 via local network 206. From state 302-1, a missed response count of missed responses may have a value of zero, a timer tick count of timer ticks may have a value of zero, and secure cryptographic module 220 may be running. Secure cryptographic module 220 may generate a first challenge. Secure cryptographic module 220 may encrypt the first challenge to a first encrypted challenge. Secure cryptographic module 220 may transmit the first encrypted challenge to mobile device 204 over local network 206. From state 302-1, in response to receiving a first encrypted response corresponding to the first challenge from mobile device 204, secure cryptographic module 220 may decrypt the first encrypted response to a first response, validate the first response, and determine, at action 320, that a valid response has been received, and enter state 302-4. From state 302-1, in response to an occurrence of a timer tick of timer module 226 and no encrypted response corresponding to the first challenge having been received from mobile device 204, at action 322, secure cryptographic module 220 may increment the timer tick count, increment the missed response count, and enter state 302-2.

From state 302-2, secure cryptographic module 220 may generate a second challenge, encrypt the second challenge to a second encrypted challenge, and may transmit the second encrypted challenge 240 to mobile device 204 over local network 206. From state 302-2, in response to receiving a second encrypted response corresponding to the second challenge from mobile device 204, secure cryptographic module 220 may decrypt the second encrypted response to a second response, validate the second response, and determine, at action 324, that a valid response has been received, and enter state 302-4. From state 302-2, in response to an occurrence of another timer tick of timer module 226 and no encrypted response corresponding to the second challenge having been received from mobile device 204, secure cryptographic module 220 may increment the timer tick count, increment the missed response count, and determine, at action 326, that the missed response count exceeds a missed response threshold, and enter state 302-3.

From state 302-3, secure cryptographic module 220 may disable access to the security services of secure cryptographic module 220 for mobile device 204. From state 302-3, in response to each occurrence of another timer tick of timer module 226, secure cryptographic module 220 may generate another challenge, encrypt the other challenge to another encrypted challenge, and transmit the other encrypted challenge to mobile device 204 over local network 206. From state 302-3, in response to receiving another encrypted response corresponding to the other challenge from mobile device 204, secure cryptographic module 220 may decrypt the other encrypted response to another response, validate the other response, and determine, at action 328, that a valid response has been received, and enter state 302-4.

From state 302-4, secure cryptographic module 220 may enable access to the security services of secure cryptographic module 220 for mobile device 204. From state 302-4, in response to enabling access to the security services of secure cryptographic module 220, secure cryptographic module 220 may reset the missed response count to a value of zero, reset the timer tick count to a value of zero, and, at action 332, enter state 302-1.

Figure 4:
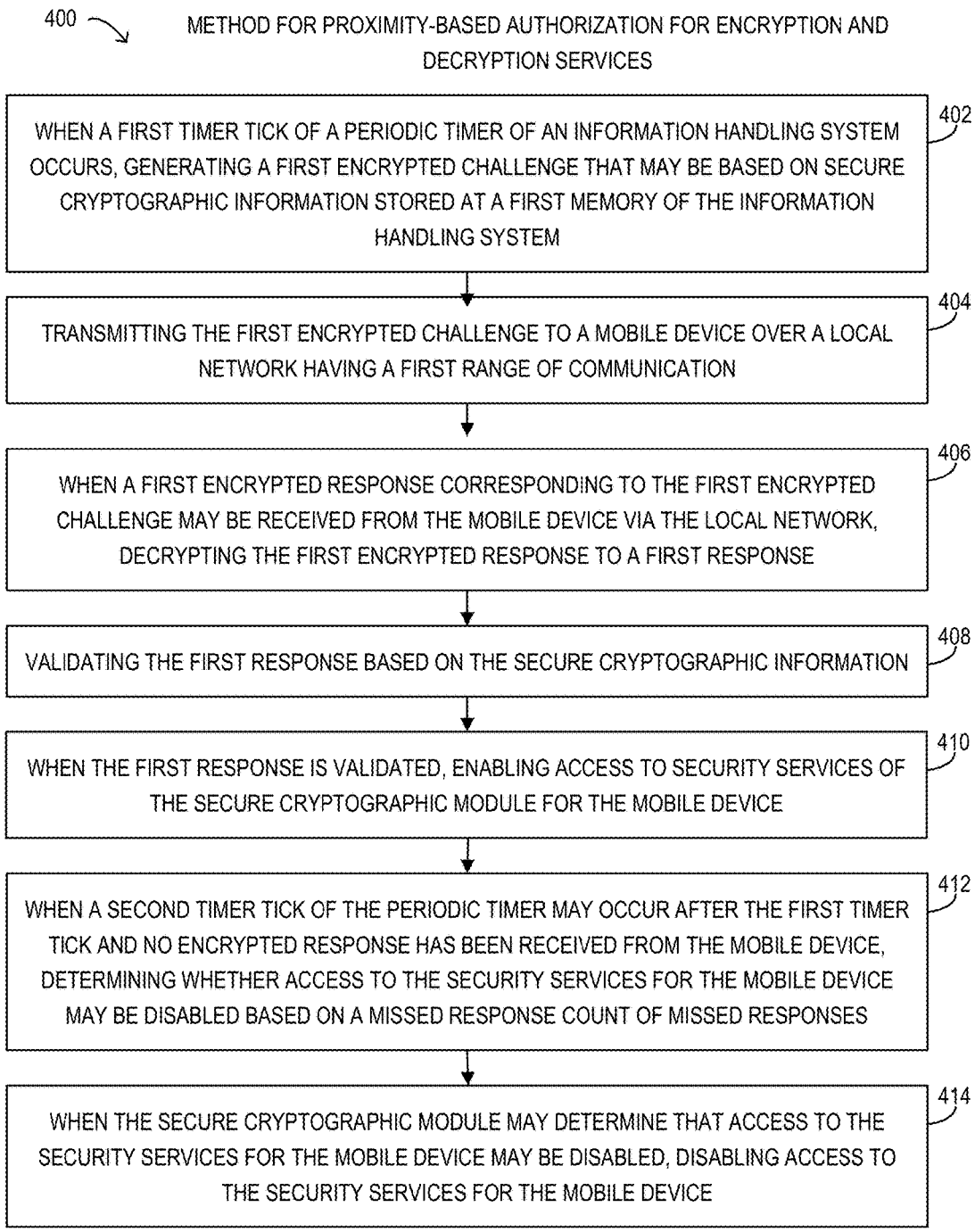
FIG. 4 is a flowchart depicting selected elements of an embodiment of a method for proximity-based authorization for encryption and decryption services.

FIG. 4 is a flowchart depicting selected elements of an embodiment of a method 400 for proximity-based authorization for encryption and decryption services. Method 400 may be performed by information handling system 100, secure cryptographic services system 200, previously described with reference to FIGS. 1 and 2, or another information handling system. It is noted that certain operations described in method 400 may be optional or may be rearranged in different embodiments.

Method 400 may begin at step 402, by, when a first timer tick of a periodic timer of an information handling system occurs, generating, by a secure cryptographic module of the information handling system, a first encrypted challenge that may be based on secure cryptographic information stored at a first memory of the information handling system. At step 404, transmitting, by the secure cryptographic module, the first encrypted challenge to a mobile device over a local network having a first range of communication. At step 406, when a first encrypted response corresponding to the first encrypted challenge may be received from the mobile device via the local network, decrypting, by the secure cryptographic module, the first encrypted response to a first response. At step 408, validating, by the secure cryptographic module, the first response based on the secure cryptographic information. At step 410, when the first response is validated, enabling, by the secure cryptographic module, access to security services of the secure cryptographic module for the mobile device. At step 412, when a second timer tick of the periodic timer may occur after the first timer tick and no encrypted response has been received from the mobile device, determining, by the secure cryptographic module, whether access to the security services for the mobile device may be disabled based on a missed response count of missed responses. At step 414, when the secure cryptographic module may determine that access to the security services for the mobile device may be disabled, disabling, by the secure cryptographic module, access to the security services for the mobile device.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   a local network;
   a first memory comprising a private region, wherein the private region is a protected area of execution protected from processes running in the information handling system outside the private region;
   secure cryptographic information stored within the private region;
   a missed response count of missed responses stored within the private region;
   a periodic timer; and
   a secure cryptographic module stored within the private region and comprising:
      a communication module; and
      security services, the secure cryptographic module configured to:

set the missed response count to a value of zero;
when a first timer tick of the periodic timer occurs:
  generate a first challenge based on the secure cryptographic information;
  encrypt the first challenge to a first encrypted challenge; and
  transmit the first encrypted challenge to a mobile device over the local network using the communication module; and
when a first encrypted response corresponding to the first encrypted challenge is received from the mobile device via the local network using the communication module:
  decrypt the first encrypted response to a first response;
  validate the first response based on the secure cryptographic information; and
  when the first response is validated:
    reset the missed response count of missed responses to the value of zero; and
    when access to the security services for the mobile device is disabled, enable access to the security services for the mobile device.

2. The information handling system of claim 1, wherein, the secure cryptographic module further configured to:
when a second timer tick of the periodic timer occurs after the first timer tick and no encrypted response has been received from the mobile device:
  increment the missed response count by a value of one;
  determine whether the missed response count exceeds a missed response threshold; and
  when the missed response count exceeds a missed response threshold, disable access to the security services for the mobile device.

3. The information handling system of claim 1, wherein the mobile device comprising:
  a second memory; and
  an authorized response provider stored at the second memory and configured to:
  in response to reception of the first encrypted challenge via the local network:
    decrypt the first encrypted challenge to the first challenge;
    generate the first response based on the first challenge and authorized response provider information stored at the second memory, wherein the authorized response provider information comprises an authorized response provider public certificate associated with the mobile device and a public key;
    encrypt the first response to the first encrypted response; and
    transmit the first encrypted response to the information handling system over the local network.

4. The information handling system of claim 3, wherein the information handling system further comprises:
  a second communication network coupled between the information handling system and the mobile device, and wherein
  the authorized response provider further configured to, when any encrypted challenges are received from the information handling system via the second communication network, discard the encrypted challenges.

5. The information handling system of claim 1, wherein the information handling system further comprises:
  a second communication network coupled between the information handling system and the mobile device, and wherein
  the secure cryptographic module further configured to, when any encrypted responses are received from the mobile device via the second communication network, discard the encrypted responses.

6. The information handling system of claim 1, wherein, the secure cryptographic module further configured to:
when no encrypted response has been received from the mobile device, a third timer tick of the periodic timer occurs after the first timer tick, and the missed response count is less than or equal to a missed response threshold:
  generate a second challenge based on the secure cryptographic information;
  encrypt the second challenge to a second encrypted challenge;
  transmit the second encrypted challenge to the mobile device over the local network using the communication module; and
  when a second encrypted response is received from the mobile device via the local network using the communication module:
    decrypt the second encrypted response to a second response;
    validate the second response based on the secure cryptographic information; and
    when the second response is validated:
      reset the missed response count to the value of zero; and
      enable access to the security services for the mobile device.

7. The information handling system of claim 1, wherein the secure cryptographic module further configured to:
when access to the security services for the mobile device is enabled and a third timer tick of the periodic timer occurs after the first timer tick:
  generate a second challenge based on the secure cryptographic information;
  encrypt the second challenge to a second encrypted challenge; and
  transmit the second encrypted challenge to the mobile device over the local network using the communication module; and
when a second encrypted response is received from the mobile device via the local network using the communication module:
  decrypt the second encrypted response to a second response;
  validate the second response based on the secure cryptographic information; and
  when the second response is validated, reset the missed response count to the value of zero.

8. The information handling system of claim 1, wherein the secure cryptographic information comprises:
  an authorized response provider public certification provided to the secure cryptographic module by the mobile device; and
  a last challenge transmitted to the mobile device.

9. The information handling system of claim 1, wherein the local network comprises one of a Bluetooth Low Energy (LE) wireless network, a Bluetooth wireless network, or a near-field communication (NFC) network, and wherein communication via the local network is limited to one of a communication range of the Bluetooth LE wireless network, a communication range of the Bluetooth wireless network, or a communication range of the near-field communication (NFC) network.

10. The information handling system of claim 1, wherein the protected area of execution of the private region of the first memory comprises an Intel® software guard extensions enclave, and wherein the secure cryptographic module further comprises Intel® software guard extensions instructions.

11. A method, comprising:
setting, by a secure cryptographic module of an information handling system stored within a private region of a first memory, a missed response count of missed responses stored within the private region to a value of zero, wherein the private region is a protected area of execution protected from processes running in the information handling system outside the private region;
when a first timer tick of a periodic timer of the information handling system occurs:
generating a first challenge based on secure cryptographic information stored within the private region;
encrypting the first challenge to a first encrypted challenge; and
transmitting the first encrypted challenge to a mobile device over a local network using a communication module of the secure cryptographic module; and
when a first encrypted response corresponding to the first encrypted challenge is received from the mobile device via the local network using the communication module:
decrypting the first encrypted response to a first response;
validating the first response based on the secure cryptographic information; and
when the first response is validated:
resetting the missed response count of missed responses to the value of zero; and
when access to security services of the secure cryptographic module for the mobile device is disabled, enabling access to the security services for the mobile device.

12. The method of claim 11, wherein, the method further comprising:
when a second timer tick of the periodic timer occurs after the first timer tick and no encrypted response has been received from the mobile device:
incrementing the missed response count by a value of one;
determining whether the missed response count exceeds a missed response threshold; and
when the missed response count exceeds a missed response threshold, disabling access to the security services for the mobile device.

13. The method of claim 11, wherein the method further comprising:
in response to reception of the first encrypted challenge via the local network by an authorized response provider stored at the second memory of the mobile device:
decrypting, by the authorized response provider, the first encrypted challenge to the first challenge;
generating, by the authorized response provider, the first response based on the first challenge and authorized response provider information stored at the second memory, wherein the authorized response provider information comprises an authorized response provider public certificate associated with the mobile device and a public key;
encrypting, by the authorized response provider, the first response to the first encrypted response; and
transmitting, by the authorized response provider, the first encrypted response to the information handling system over the local network.

14. The method of claim 13, wherein the method further comprising:
when any encrypted challenges are received from the information handling system via a second communication network coupled between the information handling system and the mobile device, discarding, by the authorized response provider, the encrypted challenges.

15. The method of claim 11, wherein the method further comprising:
when any encrypted responses are received from the mobile device via a second communication network coupled between the information handling system and the mobile device, discarding, by the secure cryptographic module, the encrypted responses.

16. The method of claim 11, wherein, the method further comprising:
when no encrypted response has been received from the mobile device, a third timer tick of the periodic timer occurs after the first timer tick, and the missed response count is less than or equal to a missed response threshold:
generating a second challenge based on the secure cryptographic information;
encrypting the second challenge to a second encrypted challenge;
transmitting the second encrypted challenge to the mobile device over the local network using the communication module; and
when a second encrypted response is received from the mobile device via the local network using the communication module:
decrypting the second encrypted response to a second response;
validating the second response based on the secure cryptographic information; and
when the second response is validated:
resetting the missed response count to the value of zero; and
enabling access to the security services for the mobile device.

17. The method of claim 11, wherein the method further comprising:
when access to the security services for the mobile device is enabled and a third timer tick of the periodic timer occurs after the first timer tick:
generating a second challenge based on the secure cryptographic information;
encrypting the second challenge to a second encrypted challenge; and
transmitting the second encrypted challenge to the mobile device over the local network using the communication module; and
when a second encrypted response is received from the mobile device via the local network using the communication module:
decrypting the second encrypted response to a second response;
validating the second response based on the secure cryptographic information; and
when the second response is validated, resetting the missed response count to the value of zero.

18. The method of claim 11, wherein the secure cryptographic information comprises:

an authorized response provider public certification provided to the secure cryptographic module by the mobile device; and a last challenge transmitted to the mobile device.

19. The method of claim 11, wherein the local network comprises one of a Bluetooth Low Energy (LE) wireless network, a Bluetooth wireless network, or a near-field communication (NFC) network, and wherein communication via the local network is limited to one of a communication range of the Bluetooth LE wireless network, a communication range of the Bluetooth wireless network, or a communication range of the near-field communication (NFC) network.

20. The method of claim 11, wherein the protected area of execution of the private region of the first memory comprises an Intel® software guard extensions enclave, and wherein the secure cryptographic module further comprises Intel® software guard extensions instructions.

\* \* \* \* \*